United States Patent Office 3,093,969
Patented June 18, 1963

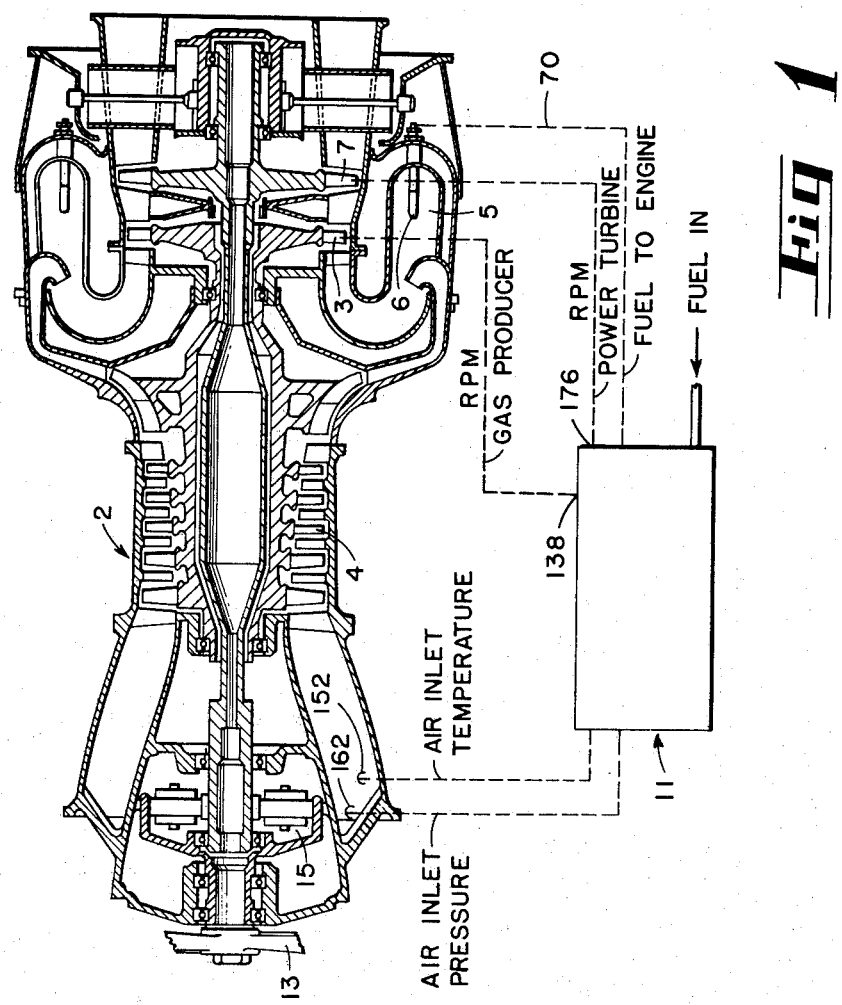

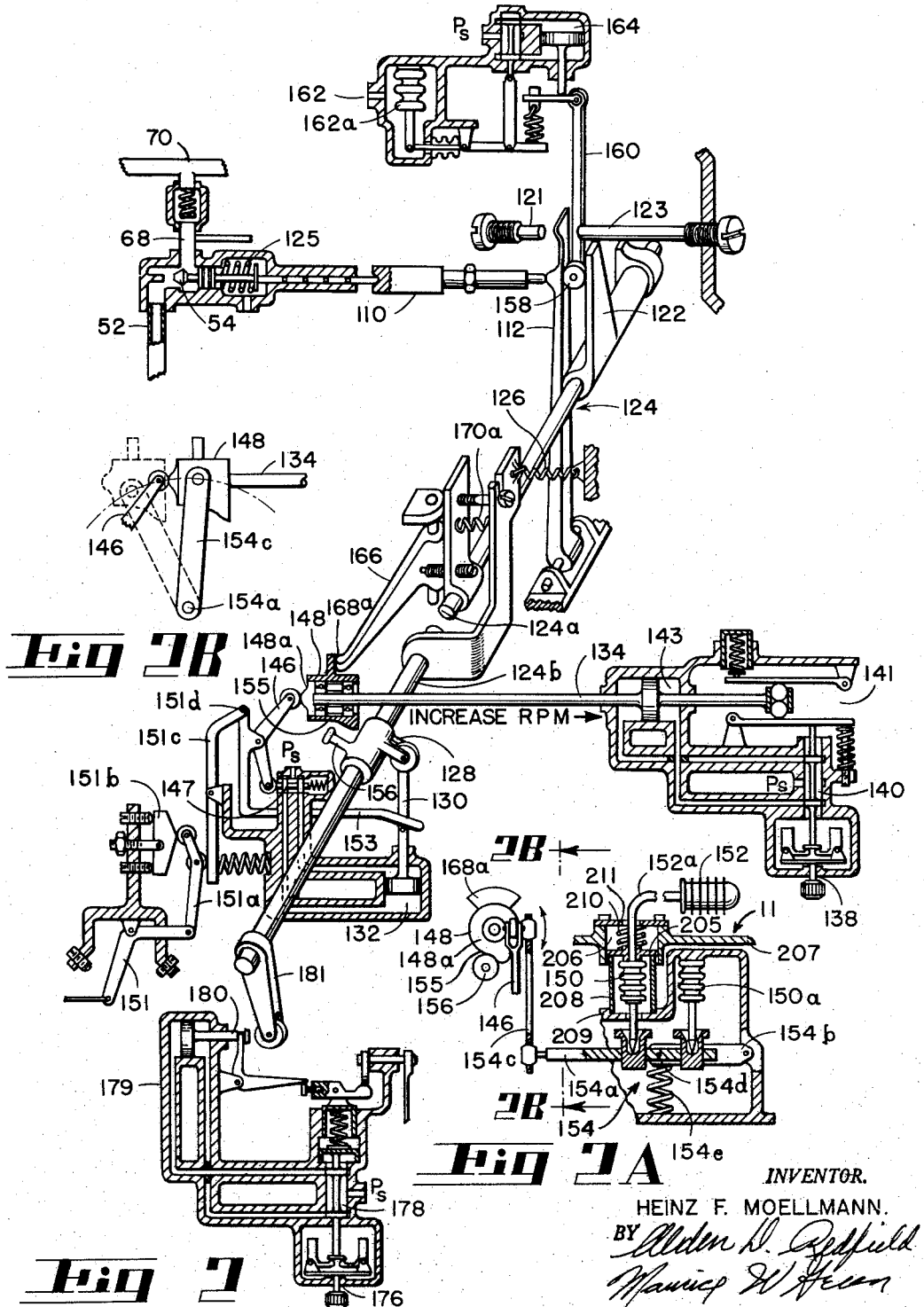

3,093,969
FUEL CONTROL TEMPERATURE UNIT
Heinz F. Moellmann, Stratford, Conn., assignor to Avco Corporation, Lycoming Division, Stratford, Conn., a corporation of Delaware
Filed May 20, 1959, Ser. No. 814,520
4 Claims. (Cl. 60—39.28)

This invention relates to a fuel control temperature unit mechanism for gas turbine engines, and is particularly related to a mechanism providing compensation of fuel flow for variations in air temperature.

In fuel control mechanisms for gas turbine engines it has been found important to provide mechanism to assure compensation of fuel flow rate for variations in temperature of inlet air, or other temperature in the engine, the variations of which are used to modify fuel flow. Other parameters commonly used in combination with air temperature, are air pressure at inlet or outlet to the compressor, rotative speed of the compressor (or so-called "gas producer"), as well as the rotative speed of the power turbine in cases of so-called free power turbine engines.

It is necessary that these several parameters act in proper relationship with each other to produce the desired results.

It has been found advantageous in many cases to employ so-called servo mechanisms hydraulically operated for actuating certain of these mechanisms, and it has also been found in the past sometimes necessary to use gearing to transmit movements of the control elements. Although in some instances these relatively complicated mechanisms are advantageous and helpful, their multiplication in each and every one of the mechanisms for each parameter of engine operation results in major addition to the mechanism and complicates unduly the assembly and operation thereof.

The present invention has for its object the provision of an improved linkage and mechanism in a fuel system for assuring compensation for variations in the air temperature. Important features of the mechanism make possible the direct connection of this unit to certain parts of the device without the use of a servo system or gearing, and the simplification of the mechanism made possible by such arrangement increases the reliability of the control by reducing friction and the so-called sensitivity to foreign objects sometimes referred to as "dirt sensitivity."

It is a further and important object of the invention that the connections are so arranged between the temperature responsive linkage and the elements actuated thereby for variation that the mechanism is most accurate in the higher speed region of engine operation, which is the most important region for temperature variation control.

It is another object to provide a motor bellows, capillary tube and temperature sensor bulb assembly so constructed that it can be removed and installed and serviced from the outside of the control unit without disturbing or dismantling other parts of the control unit.

The above and other objects of the invention will appear more fully from the following more detailed description and from the accompanying drawings forming a part hereof, and wherein:

FIGURE 1 is an illustration of a gas turbine engine with a schematic showing of the fuel control and its relationship to various parts of the engine.

FIGURE 2 is a perspective showing of the fuel control of this invention, including particularly the linkage mechanism controlling the opening of the fuel metering valve, including mechanism for imposing the control parameters of air temperature as well as other parameters of engine operation.

FIGURE 2A is a showing of the temperature control linkage.

FIGURE 2B is a further showing, on the line 2B—2B of FIGURE 2A of the temperature control linkage and connection to the rotatable cam, with dotted-line showing of another position of the control during operation.

Referring to FIGURE 1:

A gas turbine power plant 2 employs a compressor driving turbine 3, sometimes called a "gas producer turbine," which drives the air compressor 4 to furnish compressed air to an annular combustion chamber 5 to which fuel is supplied from nozzles 6 from fuel inlet 70. Turbine 3 and compressor 4 are sometimes individually and collectively referred to in the art as the gas-producer portion of the gas turbine. Resultant hot gases from combustion and resultant flow thereof act to drive the power turbine 7 as well as the so-called gas producer turbine 3 in the power plant illustrated. The power turbine 7 drives the propeller 13 through reduction gear 15 and suitable drive shaft. The fuel control is generally designated as 11 in FIGURE 1.

Various parameters of engine operation are diagrammatically illustrated in FIG. 1 as imposing fuel flow control variation on the fuel control 11. For instance, the r.p.m. of the gas producer turbine 3 is imposed at 138, which is indicated by like reference numeral in FIG. 2 of the drawings, and also the r.p.m. of the power turbine 7 is imposed at numeral 176 adjacent fuel control 11, which is also designated in FIG. 2 of the drawings. The air inlet temperature and the air inlet pressure are indicated by their elements at 152 for temperature and at 162 for pressure in the inlet to the air compressor 4, and these numerals also refer to the corresponding elements similarly numbered in FIG. 2 and 2A.

The compensating temperature control unit by which the effect of temperature variation is used in controlling the fuel flow, is imposed on the fuel control mechanism for the engine by rotation of a 3–D cam 148 carried on an end of an axially movable member 134 which moves as a function of gas producer 3, 4, speed of rotation. Various cam surfaces 148a, 155 and 168a on the aforesaid rotatable cam member 148, impose temperature compensating variations in control movements—cam 148a during steady-state operation, cam 155 during acceleration operation, and cam 168a during deceleration operation. The cooperative action of these various cam surfaces, which are all actuated as a function of temperature variation by rotation of the so-called 3–D cam 148, is later to be described. It is helpful, however, for a general understanding of the temperature linkage itself to know that the 3–D cam 148 with its several temperature compensating cam surfaces 148a, 155, and 168a, is given arcuate position in rotation by temperature responsive means. The means and linkage for imposing this arcuate positioning of 3–D cam 148 as a function of temperature variation is shown in FIGURE 2A, where it appears that an end of link 154c is connected to the side of the cam 148, the link 154c being longitudinally positioned in response to temperature variation by multiplier bar 154a, which is actuated by motor bellows 150 (FIG. 2a) connected by capillary 152a with sensor bulb 152, here shown in the inlet air (FIG. 1). Motor bellows 150 is located in the control unit 11 in close proximity to the 3–D cam 148 (FIG. 2A).

The motor bellows 150 is in a closed container and is immersed in the operating fluid, as is also the compensating bellows 150a closely adjacent thereto, as shown in FIG. 2A.

The motor bellows 150 and the compensating bellows 150a both act upon the multiplier bar 154a on opposite sides of spring 154e and pivot 154d which serves as a connection to link 154b. Spring 154e is connected below pivot 154d to support the linkage and the multiplier bar 154a thus has its lefthand end (as shown in FIG. 2A) moved as a function of the air temperature as sensed by the bulb 152 actuating the motor bellows 150 as compensated by the compensating bellows 150a.

The lefthand end of the multiplier bar 154a thus moves the link 154c, which (as viewed in FIGS. 2A and 2B) rotates the 3–D cam 148 as a function of the inlet air temperature to the compressor, and this direct lever connection through 154a, 154c to rotate the 3–D cam 148 and to position its temperature compensating cams as a function of air temperature variation.

Referring to FIG. 2, a main metering valve 54 controls fuel flow by its longitudinal position of movement, thereby determining an orifice size and rate of flow for each position made possible by a regulated uniform pressure drop across the valve by mechanism known in the art but not disclosed herein. Therefore the longitudinal position of member 110 which determines the opening of metering valve 54 controls the orifice size and therefore the amount of fuel flow to the engine. Fuel flows from source at 52, not detailed herein, through the metering valve 54 to conduits 68, 70 to the engine.

The metering valve 54 is spring urged by spring 125 in a direction to the right as shown in the drawing, and therefore movement to the left is against this spring action, as shown, and a movement of the valve actuating member 110 to the right will increase fuel flow and a movement in the opposite direction will decrease fuel flow. The various control movements to vary the flow of fuel are impressed upon this control member 110 by means of a rockshaft assembly 124, which by control contact with several levers, such as 181, 128 and 156, all projecting radially from the rockshaft assembly 124, provides a linkage for the application of the various control parameters, acting through the rockshaft, to position the actuating member 110 and thus to vary the orifice opening of the main valve 54. For the purpose of a general consideration of operation without deceleration, the two rockshaft sections 124a and 124b may be considered as unitary and rotatable as a unit.

The spring 126 and valve 54 urged by spring 125 tend to rotate the rockshaft 124 (and its parts 124a and 124b) clockwise and to open valve 54. Therefore the limitation opposing the clockwise rotation of rockshaft 124 will be imposed by the most outwardly projecing contact with a radial lever 181, 128 or 156, and the control which limits the movement of the valve toward open position to the greater extent (that is, the one calling for least fuel) will override others in its effect with the mechanical arrangement as provided.

For the purpose of setting forth the environment in which the temperature control of this invention operates, the mechanisms imposing movement for parameters other than the temperature variation will be generally described. For instance, the variation of air inlet pressure is imposed by the link 160 which is moved as a function of air inlet pressure variation by pressure-responsive unit 162a which operates through a servo unit 164 to position the roller 158 between the substantially parallel levers 112 and 122, thereby imposing a variation in leverage and in the movement of the member 110. Maximum fuel stop 123 and minimum fuel stop 121 are provided as shown. Such a mechanism is more fully described in copending application Serial No. 814,519, filed May 20, 1959.

Likewise, the effect of power turbine speed is imposed on the rockshaft through radial lever 181 by servo-mechanism 179, 180, 178, actuated through power turbine responsive governor 176.

The gas producer 3, 4 turbine speed of rotation actuates the governor 138, which, through servo mechanism 140, 143 and linkage mechanism 141, actuates a longitudinally movable member 134, which is thereby positioned as a function of gas producer speed drive 138. It is the gas producer speed responsive member 134 on which temperature variation mechanism of this invention is imposed. It should be first mentioned, however, that the rod 134 moves toward the right as shown in the drawing and as indicated by the arrow with increasing r.p.m. of the gas producer 3, 4, and toward the left for decreasing r.p.m. This longitudinal movement acts on a linkage mechanism, making first contact therewith through lever 146, which in turn actuates servo mechanism 132 to act through member 130 upon projecting lever 128 to impose the gas producer speed control variation on the rockshaft 124 to increase or decrease the opening of the fuel metering valve 54 in response thereto.

A more detailed description of the operation of the linkage (here designated generally as 146, 147), as well as the main power lever linkage mechanism (here designated generally as 151, 151a, 151b, 151c, 151d) and the feedback lever 153, are more fully described in co-pending application Serial No. 814,531, filed May 20, 1959, and assigned to the same assignee as the present invention.

The present invention is concerned in one of its aspects with a temperature compensated variation in the positioning effect of the rod 134 on lever 146—that is, the member responsive to gas producer speed—as a function of variation in temperature in the inlet to the compressor, and this is accomplished as previously described, by providing a so-called 3–D cam 148 with temperature compensating cam surfaces rotatably mounted on the axis of the rod 134, as shown. It is the rotation of this 3–D cam and the resulting effect of the cam surfaces caused by such rotation on the contact with the end lever 146 through the cam surface 148a, for a steady-state operation, and with the contact of cam surface 155 with the roller end of the lever 156 for acceleration operation, that imposes the temperature variation effect on the control mechanism.

Two parts of the rockshaft 124, namely portions 124a and 124b are connected by an overtravel spring 170a a connection which makes it possible to hold portion 124a against valve closing rotation—that is, counterclockwise rotation—by a deceleration limiting lever 166, the resilient connection being afforded by spring 170a. This entire deceleration-limiting mechanism is more fully described in copending application Serial No. 814,548, filed May 20, 1959, and for the purpose of an understanding of the present invention it may be assumed that the two rockshaft portions 124a and 124b are rotatable as a unit for steady-state operation and acceleration, and it is only for deceleration limiting schedule of control that the overtravel feature above described becomes effective. Temperature compensation for this situation is imposed by cam 168a on temperature compensating rotation of 3–D cam 148.

The linkage 154 and sensor bulb 152, motor bellows 150 and compensating bellows 150a shown in FIGURE 2A for positioning the 3–D cam 148 in various arcuate positions in response to variations in air temperature have been described previously herein and will not be repeated in detail at this point in the description. It is now apparent, with knowledge of the general arrangement, that the rotation of the 3–D cam 148 during steady-state operation, for instance, will cause the cam surface 148a to impose a temperature variation effect on the lever 146 which will vary the effect produced by the longitudinal movement of the rod 134, which it will be remembered moves as a function of the gas producer rotative speed, so that the effect of temperature variation imposed rotation on the cam 148 during the steady-state operation will be to add a temperature variation compensation to the other control movement imposed by gas producer speed of rotation.

Likewise, when acceleration operation is in effect, the rod 134, having been given a movement toward the right for increasing r.p.m., for instance, when a movement of the main power lever 151 is made to increase output, then the lever 156 with its roller end will be brought into contact with the cam surface 155 of the 3-D cam 148, and the clockwise rotation of the rockshaft 124 called for will be limited by contact with the cam surface 155, and the cam surface 155 is so formed in the circumferential direction on the cam surface 155 as to impose a temperature variation compensation by the temperature imposed rotation of the cam 148. Also, when deceleration is imposed on the system, the deceleration limiting lever 166 contacts the projection 168, and the cam surface 168a on this projection is provided with temperature variation compensation which acts also on rotation of the 3-D cam 148, temperature imposed, as previously mentioned.

The direct connection of the linkage 154a, 154c to the cam 148 (as shown in FIG. 2A) made possible by the close proximity of the control package made up of the motor bellows 150 and compensating bellows 150a connected by capillary tube to the sensor 152 located in the inlet, all makes possible a more compact arrangement which obviates the necessity for much complicated mechanism found in prior art devices. It also makes unnecessary the use of gears and servo-mechanism for this control.

Referring to FIGS. 2 and 2A and 2B:

It is noted in FIG. 2 that the rod 134 which moves as a function of gas producer 3 rotative speed indicates increasing r.p.m. with movement to the right (as viewed in FIG. 2 and as indicated by the arrow adjacent the rod 134). Referring to FIG. 2B, the link 154c and the adjacent multiplier bar 154a are so relatively positioned that with the range of movement of the rod 134 for normal speed ranges (which range is shown by dotted-line showing in FIG. 2B for lower speed range of operation, and with solid-line showing in FIG. 2B for higher speed of operation) the link 154c is positioned to be substantially perpendicular to the longitudinal movement direction of rod 134 in the high speed range, while, in the lower speed range, the axis of the link 154c is inclined as shown in dotted-lines in FIG. 2B. So it is apparent that for speeds in the high speed range, for which an accurate temperature bias is more important than at low speed operation, the variation resulting from the so-called cosine effect is less in the high r.p.m. region than in the low r.p.m. region. This positioning of the parts to use the advantage of the geometrical arrangement to assure better accuracy at high speed region of operation is an important feature of this invention, as it makes practical the direct linkage connection and avoids the use of more elaborate mechanism, such as gearing, for transmitting the movements in compact control packages.

FIG. 2A shows a detailed construction for the support of the motor bellows 150. By this construction the bellows 150, together with the capillary tube 152a and the fitting 205, as a unitary assembly, are inserted in an opening 206 in the cover 207 of the fuel control 11. The fitting 205 carrying the motor bellows 150 and the capillary tube 152a are held in the opening 206 against a tube shield 208, this tube 208 surrounding bellows 150 and being resiliently supported in the opening against frame member 209, spring 210 and an outside cover plate 211. This construction provides an outside servicing opening by which the temperature unit—i.e., motor bellows 150, capillary 152a as well as the sensor bulb 152—may be removed as a unit from the control without disturbing the remainder of the mechanism. The resilient support of the unit by the spring 210 also provides for resilient mounting of the unit and the shield tube improves the damping characteristics of the bellows, as well as minimizing error in the mechanism by deflection of parts thereof by providing a direct support on the computer housing 204.

The fuel control temperature unit has been described by reference to a specific structure found practical in actual operation, but it is understood that various modifications may be employed without departing from the general principles herein set forth. It is particularly to be emphasized in this connection that the temperature variation here used for compensating fuel flow is the inlet temperature of the air to the rotating compressor of the gas producer unit of the engine. However, it is feasible to use other temperature changes as a control parameter—for instance, temperature of the air at the outlet from the compressor—and it is therefore the intention that this invention be considered as effective for use when other gas or fluid temperature may be employed as a control parameter for an individual engine.

I claim:

1. In a fuel control mechanism for a gas turbine engine having a turbine rotating an air compressor, the combination comprising:

a rockshaft having two interconnected sections;

a fuel metering valve;

means operable by rotation of one section of said rockshaft to control the opening of said fuel metering valve;

means adjacent the other rockshaft section for rotative positioning of said rockshaft as a function of speed of rotation of said compressor comprising a movable member responsive by axial movement to variation in rotative speed of said air compressor;

a lever positioned to be actuated by said axial movement of said movable member;

and connections from said lever to rotate said other rockshaft section;

means to vary the actuating effect of the movement of said movable member on said lever as a function of change in air temperature;

said last named means comprising a rotatable cam carried on said movable member;

a cam surface on said cam for varying the relative movement between said movable member and said lever on rotative positioning of said cam;

a motor bellows responsive to variations in air temperature;

a remotely positioned air temperature sensor positioned in the region of said air compressor;

a capillary tube connection from said temperature sensor to said motor bellows for actuating said motor bellows;

a multiplier bar actuated by said motor bellows;

said motor bellows and said multiplier bar being positioned adjacent said rotatable cam;

a compensating bellows adjacent said motor bellows;

a pivot connection for said multiplier bar;

a link having one end resiliently supported and movable with respect to said pivot connection;

contacting sockets for said motor bellows and said compensating bellows on said multiplier bar on opposite sides of said pivot connection;

and a direct connecting member from said multiplier bar to said cam to rotatively position said cam with variation in air temperature.

2. In a fuel control mechanism as in claim 1 in which:

a tube shield surrounds said motor bellows;

a fitting providing means for mounting said motor bellows and said tube shield and said capillary tube in a unitary assembly;

a housing having an opening therein and a cover for said opening;

a spring between said cover and said fitting holding said fitting against said tube shield and supporting said motor bellows and said tube shield against said housing in position to contact said multiplier bar and to retain said capillary tube with said fitting and said opening with said unitary assembly in position to allow removal of said assembly without disturbing other parts of said fuel control mechanism or the relative actuating contact positioning of said bellows and said multiplier bar.

3. In a fuel control mechanism for a gas turbine engine having a turbine rotating an air compressor, the combination comprising:
a rockshaft having two interconnected sections;
a fuel metering valve;
means operable by rotation of one section of said rockshaft to control the opening of said fuel metering valve;
means adjacent the other rockshaft section for rotative positioning of said rockshaft as a function of speed of rotation of said compressor comprising a movable member responsive by axial movement to variation in rotative speed of said air compressor;
a lever positioned to be actuated by said axial movement of said movable member;
and connections from said lever to rotate said other rockshaft section;
means to vary the actuating effect of the movement of said movable member on said lever as a function of change in air temperature;
said last named means comprising a rotatable cam carried on said movable member;
a cam surface on said cam for varying the relative movement between said movable member and said lever on rotative positioning of said cam;
a motor bellows responsive to variations in air temperature;
a remotely positioned air temperature sensor located in the region of said air compressor;
a capillary tube connection from said temperature sensor to said motor bellows for actuating said motor bellows;
a multiplier bar actuated by said motor bellows;
said motor bellows and said multiplier bar being positioned adjacent said rotatable cam;
and a direct connecting member from said multiplier bar to said cam to rotatively position said cam with variation in air temperature;
said direct connecting member being positioned relative to said cam and said control member in a near perpendicular position relative to the direction of movement of said movable member in the condition corresponding to a relatively high speed of rotation of said compressor;
and said connecting member being positioned in an inclined position under conditions of lower speed of rotation of said air compressor.

4. In a fuel control for a gas turbine engine provided with a power turbine and a gas producer turbine, the combination comprising:
a rockshaft having two sections;
a resilient connection interconnecting said sections having means cooperating therewith for scheduling deceleration;
comprising a deceleration limiting lever controlled by one of said sections;
connections from said one section for actuating a fuel metering valve for said gas turbine engine;
said metering valve varying fuel supply responsive to rotational movement of said one section;
the other of said sections having controls responsive to the r.p.m. of said gas producer and said power turbine respectively for effecting rotational movement of said one section;
said other of said sections also having means to rotate said section responsive to variations in air temperature;
said last named means comprising a movable member responsive to gas producer r.p.m.;
a rotatable cam on said movable member;
a cam surface on said cam positioned to contact said deceleration limiting lever and said cam surface positioned and formed to schedule deceleration with compensation for temperature variation on rotative positioning of such cam;
a direct connected linkage responsive to variations in air temperature for rotatively positioning said cam;
said direct linkage including a multiplier bar and a motor bellows responsive to variations in air temperature positioned to contact and actuate said multiplier bar;
a pivot connection for said multiplier bar;
a link having one end resiliently supported and carrying said pivot connection;
and a direct connecting member from said multiplier bar to said cam to rotate said cam.

References Cited in the file of this patent

UNITED STATES PATENTS

| | | |
|---|---|---|
| 2,759,549 | Best | Apr. 21, 1956 |
| 2,836,957 | Fox | June 3, 1958 |
| 2,906,093 | Robinson | Sept. 29, 1959 |
| 2,941,602 | Coar | June 21, 1960 |

FOREIGN PATENTS

| | | |
|---|---|---|
| 737,354 | Great Britain | Sept. 21, 1955 |
| 753,305 | Great Britain | July 25, 1956 |